United States Patent Office 3,052,361
Patented Sept. 4, 1962

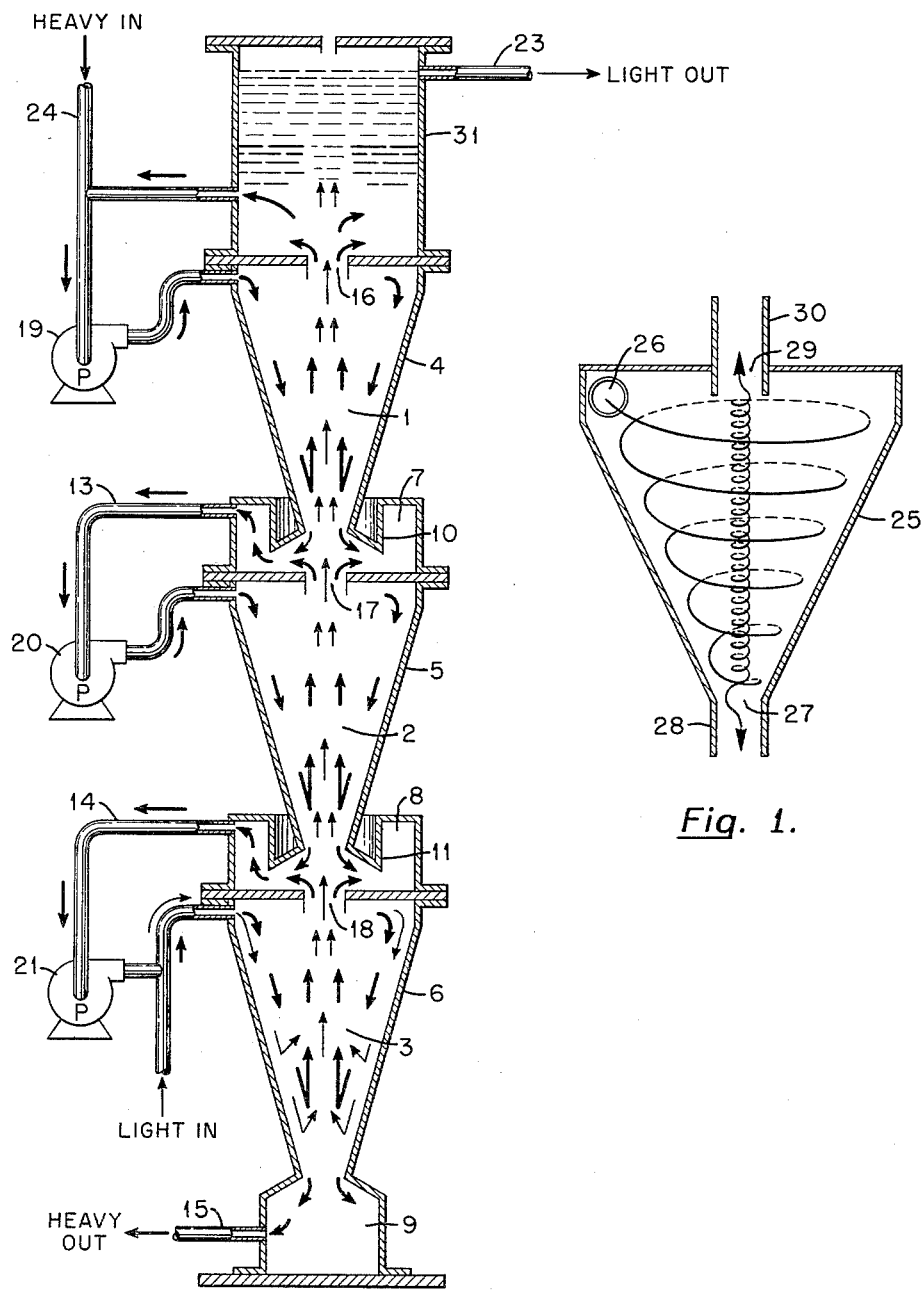

3,052,361
LIQUID CYCLONE CONTACTOR
Marvin E. Whatley and William M. Woods, Oak Ridge, Tenn., assignors to the United States of America as represented by the United States Atomic Energy Commission
Filed Dec. 6, 1960, Ser. No. 74,210
4 Claims. (Cl. 210—512)

Our invention relates to liquid-liquid extraction apparatus and specifically to an improved system for contacting and separating two immiscible liquid phases.

Liquid-liquid extraction methods are useful in many processes for recovering metal values from solutions containing said values and have proved to be highly useful in processing elements of the actinide series and in separating said elements from nuclear fission products. A typical process is one employed for the separation of plutonium values from an aqueous solution containing said values together with uranium fission product values wherein the aqueous solution is contacted with an organic solution containing an extractant which is selective for plutonium. The plutonium is thereby transferred to the organic phase, and then recovered from the organic phase. Further details concerning such a process may be found in U.S. Patents 2,924,506, issued February 9, 1960, to Herbert H. Anderson et al. for "Solvent Extraction Process for Plutonium," and 2,882,124, issued April 14, 1959, to Glenn T. Seaborg for "Solvent Extraction Process for Plutonium."

In carrying out these processes the organic extractant is exposed to high intensity radiation from radioactive fission products; the radiation breaks down the organic extractant forming products which adversely affect the extraction properties of the organic phase. It has been established that the extent of breakdown of the organic extractant is proportional to the time as well as the intensity of the radiation exposure. Accordingly, it is desirable to minimize the time of contact of the organic extractant with the fission product-containing aqueous phase.

The contact time per stage for devices depending on gravity for separation, as exemplified by a packed column or a pulse column, is relatively long. Continuous centrifuges provide a short contact time, but problems which are inherent in the operation of continuous centrifuges including solids deposition, rotor unbalance, and bearings maintenance make their use unattractive for many purposes. Attempts have been made in the prior art to use the hydraulic cyclone or hydroclone to separate two liquid phases. However, complete separation of two phases has not been achieved by employing one hydroclone, and when two or more hydroclones have been interconnected in a conventional manner, i.e., by conduit means communicating an outlet means of one with a fluid inlet of another, the two phases which may have been partially separated in the first hydroclone are remixed in passing through said conduit. This remixing increases the time required for separation of the two phases.

It is one object of our invention to provide an improved system for separating two immiscible liquids.

It is another object of our invention to provide a system for contacting and separating immiscible liquids which provides a short contact time per stage.

It is another object to provide an improved hydroclone system for contacting and separating immiscible liquids.

Other objects of our invention will be obvious from the following detailed description and the claims appended thereto.

In accordance with our invention we have provided a system for contacting and separating two immiscible liquids having different densities comprising a plurality of serially connected, axially aligned hydroclones, at least one of said hydroclones having first and second axially aligned chambers, said first chamber being provided with a base wall having an axial opening, side walls terminating in an axial opening at the apex, and means for introducing liquid within said first chamber, said means being angularly disposed through the walls of said chamber in such a manner that liquid passing therethrough enters the chamber tangentially to said side walls; said second chamber having a base wall provided with an axial opening which is common to the axial opening in the base wall of the first chamber of said hydroclone, said axial opening constituting means for transferring liquid from said first chamber into said second chamber, a cylindrical side wall, heavy liquid outlet means in said cylindrical side wall, and an opening communicating with the axial apex opening of the first chamber of the next succeeding hydroclone; pump means to transfer heavy liquid from said heavy liquid outlet means in said second chamber into said first chamber; means for introducing a heavy liquid into said system; means for introducing a light liquid into said system; means for removing said heavy liquid from said system; and means for removing said light liquid from said system.

Our system is highly efficient in contacting and separating immiscible liquids. The residence time of the light phase in the system is in the range of 2 to 25 seconds per stage, which may be compared with a residence time of from 30 to 120 seconds per stage for pulse columns, mixer settlers and hydroclones arranged in a conventional series fashion. The high efficiency of our system results from the high interliquid contact area which exists in the zone close to the axis of the hydroclones, and the continuing rotation of the liquid in passing from chamber to chamber and from one hydroclone to another in series. Inasmuch as the liquid continues its rotational motion, phase separation continues during the transfer of liquid streams from chamber to chamber and from hydroclone to hydroclone.

Our invention will be further described with reference to the drawings in which:

FIG. 1 is a diagrammatic representation of a typical hydroclone as employed in the prior art for separating two immiscible liquids; and, FIG. 2 is a diagrammatic representation of a preferred embodiment of our system of interconnected hydroclones.

Referring to FIG. 1, the fluid stream, introduced into the conical vortex chamber of hydroclone 25 through inlet port 26, enters the vortex chamber tangentially and establishes two concentric flow streams as shown by the arrows. The heavier liquid, associated with a portion of the light liquid, moves toward the wall of the chamber and through apex orifice 27 into conduit means 28. The lighter liquid, carrying a portion of the heavy liquid, moves upwardly along the axis of the hydroclone through outlet port 29 into conduit 30. Additional separation of the two phases may be accomplished by introducing the fluid streams from conduits 28 and 30 into second and third hydroclones, respectively (not shown). In this method, however, the rotational energy of the liquids is lost in passing through the conduits leading to the second and third hydroclones; the two liquids which are still partially separated in moving through ports 27 and 29 are completely remixed in passing through conduits 28 and 30; and, pumps employed to move the liquid streams into the next succeeding hydroclones cause the dispersed phase to become more highly dispersed, and coalescence of the resulting highly dispersed phase and ultimate separation of the two phases becomes difficult.

In FIG. 2, which is a diagrammatic illustration of one form of our invention, hydroclones 2 and 3 are comprised of chambers having conical surfaces 5 and 6 and cylindrical overflow chambers 7 and 8, respectively. The overflow chambers 7 and 8 are provided with baffles 10 and 11 and outlet ports communicating with conduits 13 and 14, respectively. The outlet ports are adapted to withdraw liquid from the underflow chamber tangentially to the walls of the chamber. The bases of the conical sections of hydroclones 2 and 3 are provided with orifices 17 and 18, respectively. Pumps 20 and 21 provide the energy for imparting the rotational energy to the liquid in the hydroclones. The overflow orifice 16 of hydroclone 1 communicates with overflow chamber 31. The system is provided with light fluid inlet means 22, light fluid outlet means 23, heavy fluid inlet means 24 and heavy fluid outlet means 15.

In FIG. 2 conical chambers have been depicted; it is understood, however, that any device which has axial liquid outlets, a tangential inlet, and functions as a hydraulic cyclone, including those having cylindrical bodies, will work in our system. Accordingly, in the description and in the claims the word "apex" is used to designate the portion of the hydroclone through which the heavier fluid is discharged.

In the preferred form of our system baffles 10 and 11 are disposed in cylindrical chambers 7 and 8. Our system will function in a suitable manner without the baffles if the diameter and the height of the cylindrical chamber are of suitable dimensions to prevent the light liquid from moving toward the outlet in the cylinder walls together with the heavy liquid. If the light fluid accompanies the heavy fluid in the absence of baffles, the movement of light liquid toward the cylinder walls may be reduced either by increasing the diameter of the cylindrical chamber or by decreasing the height of the cylindrical chamber, or by both.

In employing our system shown in FIG. 1 as a liquid-liquid contacting and separating device, a light liquid is supplied under pressure to the lower chamber of hydroclone 3, together with recycled heavy liquid from pump 21, and a heavy liquid is introduced into hydroclone 1 through pump 19. The liquid moving into cylindrical overflow chambers 7 and 8 from both directions comprises both light and heavy liquid. This liquid retains its rotational motion in passing into the overflow chambers and the heavy liquid is thereby urged toward the outer walls of the overflow chambers while the light liquid is carried upwardly along the axis of the hydroclones. The heavy liquid flows into the suction ports in the walls of the overflow chambers, then into the pumps associated therewith, and is pumped into the conical chamber of the hydroclone.

Preservation of the rotational characteristics and thus the centrifugal field of the overflow stream during inter-hydroclone transfer is critical in attaining the high efficiency of our system, and this is possible only by elimination of the conduits which have been employed in the prior art systems in transferring liquid from one hydroclone to the next in series. The tangential connection of the heavy fluid outlet conduit to the underflow chamber accentuates the rotational motion of the fluid in the underflow chamber.

An important advantage in employing our system lies in the lack of a need for interstage flow control mechanisms. In a system employing hydroclones with interconnecting conduits, as in the prior art, the output of the pumps employed must be controlled closely and coordinated with the amount of liquid brought into and removed from the system. In our system there is no need for interstage flow control. The output of the pumps must merely be maintained at a level which provides a pressure drop within the hydroclones sufficient to ensure that an adequate centrifugal field is established and maintained. The minimum pressure drop per hydroclone which is necessary to provide suitable contacting and separation of two liquid phases will depend on the physical properties of the liquids being contacted, and the dimensions of the hydroclones employed in the system. Typical pressure drops are in the range of 20 to 35 pounds per square inch for a system employing conical hydroclones having a ¾ inch diameter base, a ¼ inch diameter apex and having a height of 3 inches.

It is obvious that our system can be adapted to separate two immiscible liquids as well as to contact and separate two phases. In separating a mixture of two phases, the feed point should be at some point intermediate the ends, sufficient stages being provided above and below the feed point to effect the desired separation. It is also obvious that any desired number of hydroclones can be placed in series depending on the number of stages which are needed.

Having thus described our invention, we claim the following:

1. A system for contacting and separating two immiscible liquids having different densities comprising a plurality of serially connected, axially aligned hydroclones, including first and second hydroclones, said first hydroclone having a chamber defined by a circular top wall provided with an axial opening and downwardly converging conical side walls terminating in an axial opening, and means for introducing a heavy liquid within said chamber, said means being angularly disposed through said side walls in such a manner that a liquid passing therethrough enters said chamber tangentially to said side walls; said second hydroclone having first and second chambers axially aligned to each other and to said chamber of said first hydroclone, said first chamber having a circular top wall defining an axial opening, downwardly converging conical side walls terminating in an axial opening, and means for introducing liquid within said first chamber, said means being angularly disposed through said side walls of said first chamber in such a manner that a liquid passing therethrough enters the chamber tangentially to said side walls; said second chamber having a top wall defining an axial opening common to the axial opening defined by the conical side walls of said chamber of said first hydroclone, a circular bottom wall provided with an axial opening which is common to the axial opening in the circular top wall of said first chamber of said second hydroclone, said axial opening in said bottom wall constituting means for transferring a liquid between said first chamber and said second chamber, a cylindrical side wall secured at its top and bottom ends to said top and bottom walls of said second chamber respectively, heavy liquid outlet means in said cylindrical side wall, pump means to transfer heavy liquid from said second chamber into said first chamber through said heavy liquid outlet means in said cylindrical side wall; means for introducing a light liquid into said system through said second hydroclone; means for removing said heavy liquid from said system through said second hydroclone; and means for removing said light liquid from said system through said first hydroclone.

2. The system of claim 1 wherein the heavy liquid outlet means provided in the cylindrical side wall of the second chamber of said second hydroclone is tangentially disposed with respect to said cylindrical side wall.

3. The system of claim 1 wherein said second chamber of said second hydroclone is provided with baffle means disposed between said heavy liquid outlet means and said axial opening in the upper wall of said second chamber.

4. The system of claim 1 wherein means are provided for introducing a mixture of liquids into said system through at least one of said hydroclones and said second chamber of said second hydroclone is provided with baffle means disposed between said heavy liquid outlet means and said axial opening in the upper wall of said second chamber.

References Cited in the file of this patent

UNITED STATES PATENTS

| | | |
|---|---|---|
| 2,590,691 | Fontein | Mar. 25, 1952 |
| 2,754,968 | Vegter et al. | July 17, 1956 |
| 2,794,832 | Rietema | June 4, 1957 |